US012754767B2

(12) United States Patent
Endo et al.

(10) Patent No.: US 12,754,767 B2
(45) Date of Patent: Oct. 6, 2026

(54) COMPUTER-READABLE RECORDING MEDIUM STORING RESOURCE MANAGEMENT PROGRAM, RESOURCE MANAGEMENT METHOD, AND MANAGEMENT DEVICE

(71) Applicant: Fsas Technologies Inc., Kawasaki (JP)

(72) Inventors: Hiroshi Endo, Fuji (JP); Satoshi Kazama, Kawasaki (JP); Kazuhiro Suzuki, Kawasaki (JP)

(73) Assignee: Fsas Technologies Inc., Kawasaki (JP)

( * ) Notice: Subject to any disclaimer, the term of this patent is extended or adjusted under 35 U.S.C. 154(b) by 456 days.

(21) Appl. No.: 18/484,772

(22) Filed: Oct. 11, 2023

(65) Prior Publication Data

US 2024/0202027 A1 Jun. 20, 2024

(30) Foreign Application Priority Data

Dec. 19, 2022 (JP) ................................. 2022-202555

(51) Int. Cl.
*G06F 9/50* (2006.01)
*G06F 9/48* (2006.01)

(52) U.S. Cl.
CPC .............. *G06F 9/5005* (2013.01); *G06F 9/48* (2013.01); *G06F 9/4806* (2013.01); *G06F 9/4881* (2013.01); *G06F 9/50* (2013.01); *G06F 9/5061* (2013.01); *G06F 9/5072* (2013.01); *G06F 9/5083* (2013.01)

(58) Field of Classification Search
CPC ........ G06F 9/48; G06F 9/4806; G06F 9/4881; G06F 9/50; G06F 9/5005; G06F 9/5061; G06F 9/5072; G06F 9/5077; G06F 9/5083
See application file for complete search history.

(56) References Cited

U.S. PATENT DOCUMENTS 11,138,049 B1 * 10/2021 Featonby ............ G06F 11/3447
2014/0317265 A1 * 10/2014 James ................. H04L 67/1004 709/224
2016/0170791 A1 * 6/2016 Huh .................... G06F 9/45558 718/1
2021/0382757 A1 12/2021 Azuma et al.
2022/0179709 A1 * 6/2022 Yang ..................... G06F 9/5038
2022/0247823 A1 * 8/2022 Cunningham ...... H04L 63/0807
2024/0154415 A1 * 5/2024 Zeighami ................ H02J 3/003

FOREIGN PATENT DOCUMENTS

JP 2017-191485 A 10/2017
JP 2019-071026 A 5/2019
JP 2021-193504 A 12/2021

* cited by examiner

*Primary Examiner* — Charles M Swift
(74) *Attorney, Agent, or Firm* — ArentFox Schiff LLP

(57) ABSTRACT

A non-transitory computer-readable recording medium storing a resource management program for causing a computer that manages a virtualization system to execute a process, the process includes obtaining a first score according to a time-series number of unused resources for each resource type in the virtualization system, based on a use history of resources in the virtualization system by a user, obtaining, for each resource, a second score according to a use frequency and compatibility with another resource, and allocating each resource to the user in ascending order of a total value of the first score and the second score.

9 Claims, 23 Drawing Sheets

FIG. 10

143

| RESOURCE ID | RESOURCE NAME | RESOURCE TYPE | RESOURCE MODEL | MACHINE DEPLOYMENT STATE |
|---|---|---|---|---|
| 1 | CPU NODE_A | CPU NODE | Xxxxx | IN USE |
| 2 | GPU_B | GPU | Yyyyy | UNUSED |
| 3 | SSD_C | SSD | Zzzzz | IN USE |
| 4 | CPU NODE_B | CPU NODE | Xxxxx | IN USE |
| 5 | CPU NODE_A | CPU NODE | Xxxxx | UNUSED |
| ⋯ | ⋯ | ⋯ | ⋯ | ⋯ |

FIG. 11

141

| USE HISTORY ID | MACHINE NAME | USER NAME | DEPLOYMENT DATE AND TIME | DISASSEMBLY DATE AND TIME | USED RESOURCE (ONLY RESOURCE DESIGNATED BY USER) | | | | USED Image | VERSION OF USED DRIVER | INFORMATION REGARDING REQUEST FROM USER |
|---|---|---|---|---|---|---|---|---|---|---|---|
| 1 | MACHINE_A | PERSON A | 1/8/2022 17:00 | 2/8/2022 17:00 | CPU NODE_A | GPU_B* | ··· | | CentOS | Xxx | ·GPU WITH PERFORMANCE EQUAL TO OR MORE THAN xx |
| 2 | MACHINE_B | PERSON B | 1/9/2022 16:00 | 4/1/2022 11:00 | CPU NODE_A | GPU_B | SSD_A | ··· | CentOS | Xxx | |
| 3 | MACHINE_C | PERSON C | 1/10/2022 14:00 | 3/13/2022 15:00 | CPU NODE_B | GPU_B* | SSD_A* | ··· | Win10 | Xxx | ·GPU WITH PERFORMANCE EQUAL TO OR MORE THAN xx<br>·SSD WITH PERFORMANCE EQUAL TO OR MORE THAN xx |
| 4 | MACHINE_D | PERSON A | 1/11/2022 12:00 | 11/11/2022 14:00 | CPU NODE_B | SSD_A | SSD_A | ··· | Ubuntsu | Xxx | |
| 5 | MACHINE_E | PERSON A | 1/12/2022 17:00 | 1/13/2022 17:00 | CPU NODE_A | | | | CentOS | xxx | |
| | ··· | | ··· | ··· | ··· | ··· | ··· | ··· | ··· | ··· | |

FIG. 12

142

| RESOURCE ID | RESOURCE NAME | RESOURCE TYPE | RESOURCE MODEL | RESOURCE SPECIFICATION | | |
|---|---|---|---|---|---|---|
| 1 | CPU NODE_A | CPU NODE | Xxxxx | xxxGHz | 2core | ... |
| 2 | GPU_B | GPU | Yyyyy | ... | | |
| 3 | SSD_C | SSD | Zzzzz | xxxGB | ... | |
| 4 | CPU NODE_B | CPU NODE | Xxxxx | xxxGHz | 1core | ... |
| ... | ... | ... | ... | ... | ... | ... |

FIG. 16

144

| RESOURCE COMBINATION | CPU (HIGH PERFORMANCE) | GPU (HIGH PERFORMANCE) | GPU (MEDIUM PERFORMANCE) | BOOT_A | BOOT_B | BOOT_C | ... |
|---|---|---|---|---|---|---|---|
| CPU (HIGH PERFORMANCE) | | 1 | | 1 | | | ... |
| GPU (HIGH PERFORMANCE) | 1 | 1 | | 1 | 2 | 1 | ... |
| GPU (MEDIUM PERFORMANCE) | | | | | | 1 | ... |
| BOOT_A (img FILE) | 1 | 1 | | | | | ... |
| BOOT_B (img FILE) | | 2 | | | | | ... |
| BOOT_C (img FILE) | | 1 | 1 | | | | ... |
| ... | | | | | | | ... |
| ... | | | | | | | ... |

FIG. 17

144

| RESOURCE COMBINATION | CPU (HIGH PERFORMANCE) | GPU (HIGH PERFORMANCE) | GPU (MEDIUM PERFORMANCE) | BOOT_A | BOOT_B | BOOT_C | ... |
|---|---|---|---|---|---|---|---|
| CPU (HIGH PERFORMANCE) | | 1 | × | 1 | | | ... |
| GPU (HIGH PERFORMANCE) | 1 | 1 | | 1 | 2 | 1 | ... |
| GPU (MEDIUM PERFORMANCE) | × | | | | | 1 | ... |
| BOOT_A (img FILE) | 1 | 1 | | × | × | × | ... |
| BOOT_B (img FILE) | | 2 | | × | × | × | ... |
| BOOT_C (img FILE) | | 1 | 1 | × | × | × | ... |
| ... | | | | | | | ... |

FIG. 18

| RESOURCE | SCORE OBTAINED BASED ON BOOT IMAGE AND THE NUMBER OF TIMES OF COMBINATIONS BETWEEN RESOURCES |
|---|---|
| CPU (HIGH PERFORMANCE) | 3 |
| GPU (HIGH PERFORMANCE) | 12 |
| GPU (MEDIUM PERFORMANCE) | 1 |
| BOOT_A (img FILE) | 1 |
| BOOT_B (img FILE) | 1 |
| BOOT_C (img FILE) | 1 |
| ... | |

FIG. 19

SCORE OBTAINED BY ESTIMATING THE NUMBER OF REMAINING RESOURCES F1

| RESOURCE | SCORE OBTAINED BY ESTIMATING THE NUMBER OF REMAINING RESOURCES |
|---|---|
| CPU (HIGH PERFORMANCE) | 10 |
| CPU (MEDIUM PERFORMANCE) | 5 |
| CPU (LOW PERFORMANCE) | 1 |
| GPU (HIGH PERFORMANCE) | 1 |
| GPU (MEDIUM PERFORMANCE) | 10 |
| GPU (LOW PERFORMANCE) | 5 |
| ... | |

BOOT IMAGE AND THE NUMBER OF TIMES OF COMBINATIONS BETWEEN RESOURCES F2

| RESOURCE | SCORE OBTAINED BASED ON BOOT IMAGE AND THE NUMBER OF TIMES OF COMBINATIONS BETWEEN RESOURCES |
|---|---|
| CPU (HIGH PERFORMANCE) | 3 |
| GPU (HIGH PERFORMANCE) | 12 |
| GPU (MEDIUM PERFORMANCE) | 1 |
| BOOT_A (img FILE) | 1 |
| BOOT_B (img FILE) | 1 |
| BOOT_C (img FILE) | 1 |
| ... | |

ADD

RESOURCE POINT ALLOCATION DB F3 145

| RESOURCE | SCORE |
|---|---|
| CPU (HIGH PERFORMANCE) | 13 |
| CPU (MEDIUM PERFORMANCE) | 5 |
| CPU (LOW PERFORMANCE) | 1 |
| GPU (HIGH PERFORMANCE) | 13 |
| GPU (MEDIUM PERFORMANCE) | 21 |
| GPU (LOW PERFORMANCE) | 5 |
| BOOT_A (img FILE) | 1 |
| BOOT_B (img FILE) | 1 |
| BOOT_C (img FILE) | 1 |
| ... | |

COMPUTER-READABLE RECORDING MEDIUM STORING RESOURCE MANAGEMENT PROGRAM, RESOURCE MANAGEMENT METHOD, AND MANAGEMENT DEVICE

CROSS-REFERENCE TO RELATED APPLICATION

This application is based upon and claims the benefit of priority of the prior Japanese Patent Application No. 2022-202555, filed on Dec. 19, 2022, the entire contents of which are incorporated herein by reference.

FIELD

The embodiment discussed herein is related to a resource management program, a resource management method, and a management device.

BACKGROUND

In a composable infrastructure system (in other words, virtualization system), a central processing unit (CPU) resource and a storage resource are separated from each other, and logically pooled.

The composable infrastructure system is a solution for freely extracting an optimal resource for various workloads from a resource pool and configuring and providing the resource to a machine.

For example, in a large-scale system, resources having various specifications may exist in the resource pool.

FIG. 1 is a block diagram illustrating resource extraction processing of a composable infrastructure system 600 as a typical example.

As indicated by a reference A1, in a YAML 601 (request order), a user 7 designates "BOOT (no resource condition)" as a target image and designates "CPU (no designation)*1", "GPU (no designation)*1", and "SSD*1" as configuration resources.

As indicated by a reference A2, the YAML 601 is input into a management device 6 as a user's request (in other words, job).

As indicated by a reference A3, the management device 6 selects a resource to be transferred to the user from a resource pool 602.

In the example illustrated in FIG. 1, the resource pool 602 includes four low-performance CPU nodes, two high-performance CPU nodes, three low-performance graphical processing units (GPU), three high-performance GPUs, and six solid state drives (SSD). Note that the single low-performance CPU node, the single low-performance GPU, the single high-performance GPU, and the single SSD are in use.

As indicated by a reference A4, the management device 6 extracts a requested resource from the resource pool 602, and a created machine 603 is presented. In the created machine 603, in addition to various drivers and an Image file that have been registered in advance, the single low-performance CPU, the single low-performance GPU, and the single SSD extracted from the resource pool 602 are registered.

Japanese Laid-open Patent Publication No. 2021-193504, Japanese Laid-open Patent Publication No. 2017-191485, and Japanese Laid-open Patent Publication No. 2019-071026 are disclosed as related art.

SUMMARY

According to an aspect of the embodiments, a non-transitory computer-readable recording medium storing a resource management program for causing a computer that manages a virtualization system to execute a process, the process includes obtaining a first score according to a time-series number of unused resources for each resource type in the virtualization system, based on a use history of resources in the virtualization system by a user, obtaining, for each resource, a second score according to a use frequency and compatibility with another resource, and allocating each resource to the user in ascending order of a total value of the first score and the second score.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a table illustrating the resource pool registration and deployment status DB according to the embodiment;

FIG. 11 is a table illustrating the resource use history DB according to the embodiment;

FIG. 12 is a table illustrating the resource specification DB according to the embodiment;

FIG. 16 is a table illustrating a first example of the request combination table DB according to the embodiment;

FIG. 17 is a table illustrating a second example of the request combination table DB according to the embodiment;

FIG. 18 is a table illustrating a holding point of each resource according to the embodiment;

FIG. 19 is a diagram for explaining processing for generating a resource point allocation DB according to the embodiment;

DESCRIPTION OF EMBODIMENTS

Figure 1:
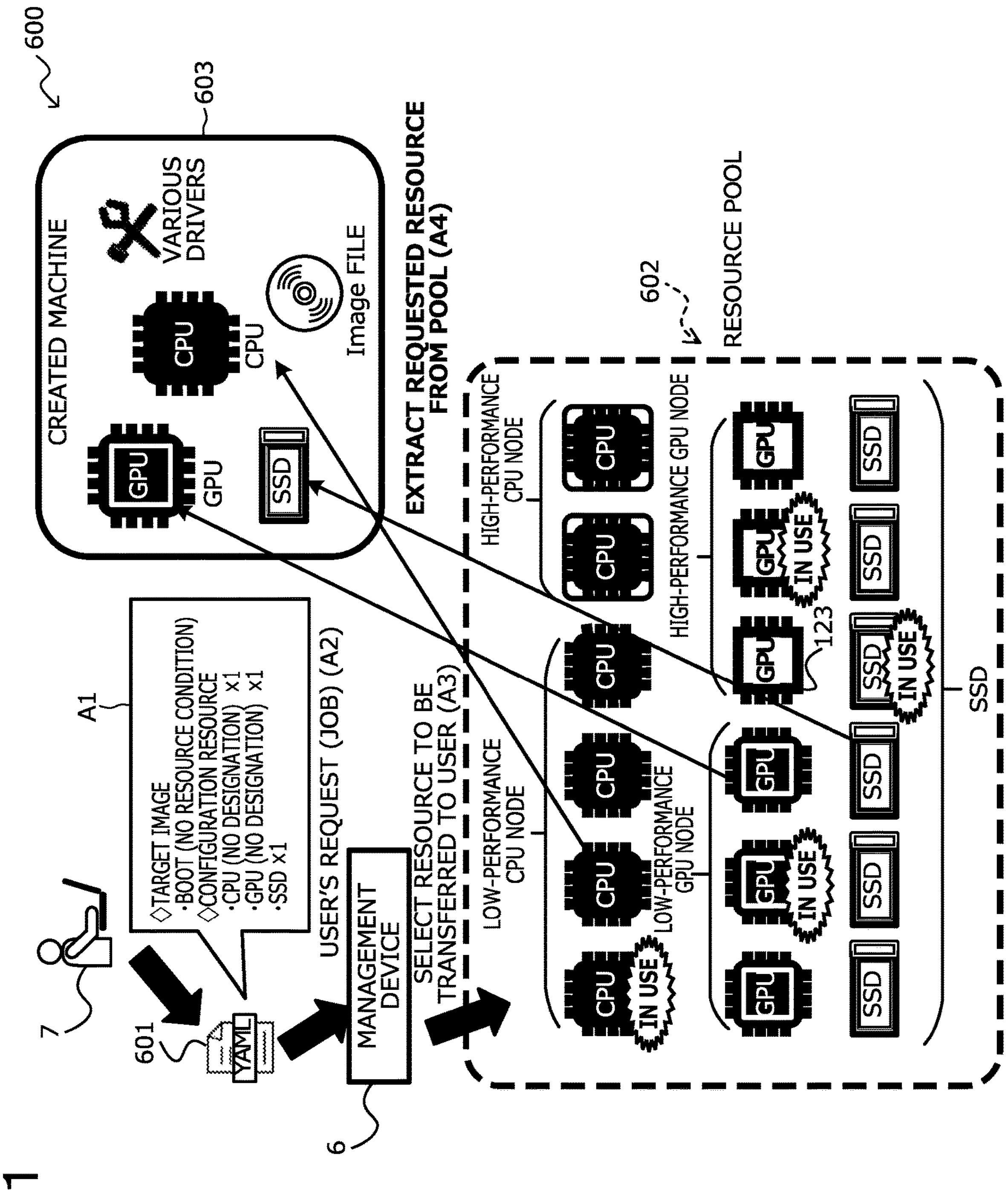
FIG. 1 is a block diagram illustrating resource extraction processing of a composable infrastructure system as a typical example.

In a composable infrastructure system, since there is a case where it is not possible to appropriately allocate a hardware resource to a job, there is a possibility that the hardware resource is depleted and it is not possible to execute a new job. For example, in a case where a high-performance resource request is issued, there is a case where it is not possible to perform deployment with only remaining resources.

[A] Embodiment

Hereinafter, an embodiment of techniques capable to improve a utilization efficiency of a virtualization system will be described with reference to the drawings. Note that the embodiment to be described below is merely an example, and there is no intention to exclude application of various modifications and techniques not explicitly described in the embodiment. For example, the present embodiment may be variously modified and carried out in a range without departing from the spirit of the embodiments. Furthermore, each drawing is not intended to include only components illustrated in the drawing, and may include another function or the like.

Figure 2:
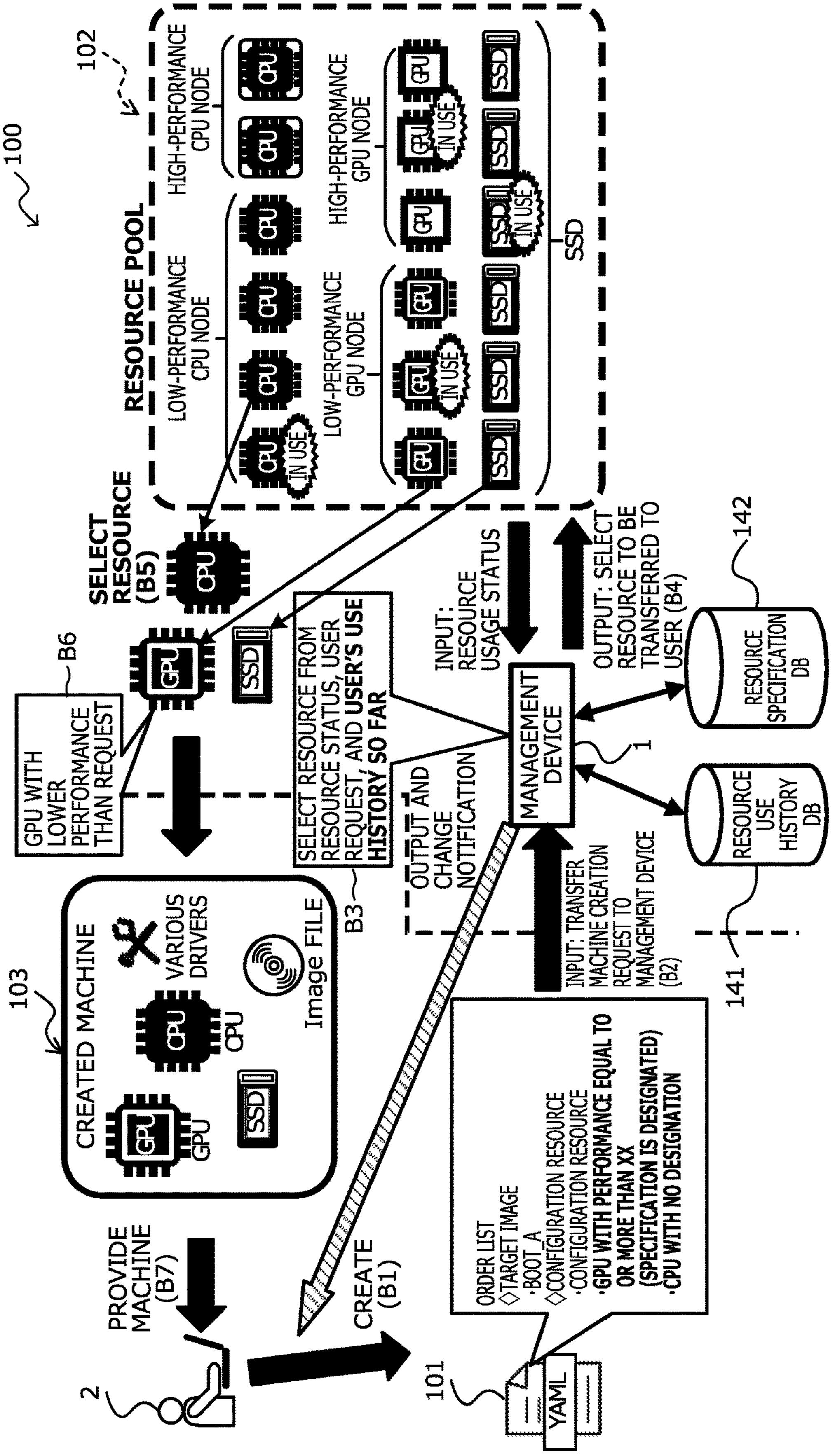
FIG. 2 is a block diagram illustrating resource extraction processing of a composable infrastructure system according to an embodiment.

FIG. 2 is a block diagram illustrating resource extraction processing of a composable infrastructure system 100 according to the embodiment.

The composable infrastructure system 100 is an example of a virtualization system and includes a management device 1.

The management device 1 receives a request of a user terminal 2 (hereinafter, also referred to as user 2) in the composable infrastructure system 100 and returns a hardware resource to be used for the request.

For example, the management device 1 extracts the hardware resource in response to the request of the user 2, based on a usage record of the composable infrastructure system 100 and returns the hardware resource. However, the management device 1 intentionally extracts a hardware resource with a lower performance than the request, in a busy period of the composable infrastructure system 100, so as to accept more jobs.

As indicated by a reference B1, in YAML 101 (request order), the user 2 designates "BOOT_A" as a target image and designates "SSD_A (direct type designation), "GPU with performance equal to or more XX (specification designation), and "no CPU designation" as configuration resources.

As indicated by a reference B2, the YAML 101, as a machine creation request, is transferred to the management device 1.

As indicated by a reference B3, the management device 1 selects a resource from a resource status based on a resource specification DB 142, a user request, and a resource use history DB 141 indicating a use history from the user 2. Note that details of the resource use history DB 141 will be described later with reference to FIG. 11 or the like, and details of the resource specification DB 142 will be described later with reference to FIG. 12 or the like.

The management device 1 selects a CPU with a low performance (in other words, not popular) in the YAML 101, since no CPU is designated. The management device 1 may select a GPU of which a performance is equal to or more than the GPU performance xx and equal to or less than the performance lower limit from the usage record, in the YAML 101.

In a case where a resource usage status in a resource pool 102 is changed, the management device 1 may receive input of information regarding the change in the resource usage status. Furthermore, the management device 1 may output various types of information and issues a change notification to the user.

As indicated by a reference B4, the management device 1 selects a resource to be transferred to the user, from the resource pool 102.

In the example in FIG. 2, the resource pool 102 includes four low-performance CPU nodes, two high-performance CPU nodes, three low-performance GPUs, three high-performance GPUs, and six SSDs. Note that the single low-performance CPU node, the single low-performance GPU, the single high-performance GPU, and the single SSD are in use.

As indicated by a reference B5, the management device 1 extracts a requested resource from the resource pool 102, and a created machine 103 is presented. In the created machine 103, in addition to various drivers and an Image file that have been registered in advance, the single low-performance CPU, the single low-performance GPU, and the single SSD extracted from the resource pool 102 are registered.

As indicated by a reference B6, a GPU registered in the created machine 103 is a GPU having lower performance than the request.

As indicated by a reference B7, the management device 1 provides the created machine 103 to the user 2.

Figure 3:
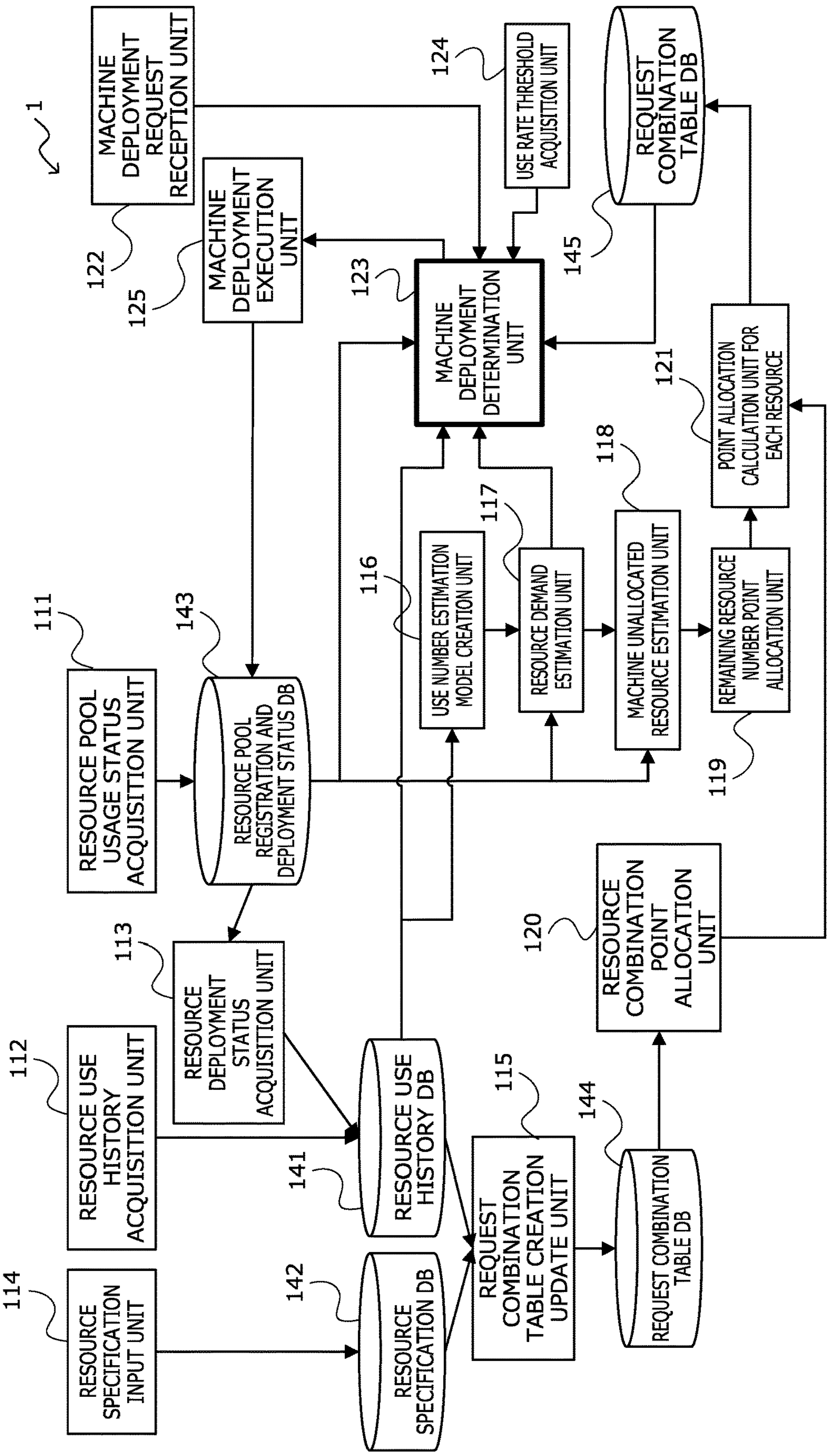
FIG. 3 is a block diagram schematically illustrating a software configuration example of a management device according to the embodiment.

FIG. 3 is a block diagram schematically illustrating a software configuration example of the management device 1 as the embodiment.

The management device 1 functions as a resource pool usage status acquisition unit 111, a resource use history acquisition unit 112, a resource deployment status acquisition unit 113, a resource specification input unit 114, a request combination table creation update unit 115, a use number estimation model creation unit 116, a resource demand estimation unit 117, a machine unallocated resource estimation unit 118, a remaining resource number point allocation unit 119, a resource combination point allocation unit 120, a point allocation calculation unit for each resource 121, a machine deployment request reception unit 122, a machine deployment determination unit 123, a use rate threshold acquisition unit 124, a machine deployment execution unit 125.

Furthermore, the management device 1 includes the resource use history DB 141, the resource specification DB 142, a resource pool registration and deployment status DB 143, a request combination table DB 144, and a resource point allocation DB 145.

The resource pool usage status acquisition unit 111 periodically acquires a resource use status of each resource. In a case where the resource use statuses of the respective resources are different (in other words, updated), the resource pool usage status acquisition unit 111 registers a current use status in the resource pool registration and deployment status DB 143.

When a resource use request is issued from the user, the resource use history acquisition unit 112 registers user information, resource request information, and a request date and time in the resource use history DB 141.

The resource deployment status acquisition unit 113 extracts a resource use result from the resource pool registration and deployment status DB 143 and registers the result, as a deployment result for the request, in the resource use history DB 141.

Each time when a new model of a resource is added to the resource pool 102, a system administrator (not illustrated) registers a resource specification (in other words, specification value) of the resource in the resource specification DB 142 by the resource specification input unit 114.

The request combination table creation update unit 115 periodically acquires the resource specification DB 142 and the resource use history DB 141.

In a case where there is a resource combination newly designated by the user in the resource use history DB 141, the request combination table creation update unit 115 creates the request combination table DB 144 from the resource use history DB 141. Then, the request combination table creation update unit 115 counts the number of request combinations from the resource specification DB 142 and the resource use history DB 141 and writes the number into a table of the request combination table DB 144.

In a case where there is a resource combination that is incompatible with the resource specification DB 142, the request combination table creation update unit 115 extracts a resource that cannot be combined from the resource specification DB 142 and writes "×" in the table of the request combination table DB 144.

The use number estimation model creation unit 116 acquires time-series data of a resource use history from the resource use history DB 141. The use number estimation model creation unit 116 creates a use number estimation model for each resource type.

The resource demand estimation unit 117 acquires a use number estimation value in an arbitrary time period, using the use number estimation model.

The machine unallocated resource estimation unit 118 acquires an estimation value of a machine unallocated resource (in other words, remaining number) in an arbitrary time period for each resource type, using the use number estimation model.

The remaining resource number point allocation unit 119 evaluates the remaining number for each resource type based on the estimation value of the machine unallocated resource and gives a higher score as the number of remaining resources is smaller. In other words, the remaining resource number point allocation unit 119 is an example of a point allocation unit and calculates a first score according to the number of unused resources in time series for each resource type of a virtualization system 100, from the resource use history DB 141 of the virtualization system 100 by the user 2.

The resource combination point allocation unit 120 allocates points to each resource, based on the request combination table DB 144. For example, "1"=2 points, "x"=−1 point, or the like in the table in the request combination table DB 144 are allocated. In other words, the resource combination point allocation unit 120 is an example of a point allocation unit and calculates a second score according to a use frequency and compatibility with another resource, for each resource.

The point allocation calculation unit for each resource 121 adds the points to the respective resources obtained by the resource combination point allocation unit 120 and the remaining resource number point allocation unit 119 and stores the added points in the resource point allocation DB 145.

The machine deployment request reception unit 122 receives a machine deployment request from the user 2.

The machine deployment determination unit 123 determines machine deployment from an estimated resource demand and the machine deployment request.

The machine deployment determination unit 123 refers to the resource use history DB 141 and acquires a past deployment history of the requesting user.

The machine deployment determination unit 123 acquires a resource use rate of a current system from the resource pool registration and deployment status DB 143 and acquires a resource use rate of a future system from the resource demand estimation unit 117.

The machine deployment determination unit 123 acquires an upper limit threshold from the use rate threshold acquisition unit 124.

In a case where the resource use rates of the current and the future systems are higher than the upper limit threshold and shortage is solved by changing the resource to a resource in the past deployment history of the requesting user, the machine deployment determination unit 123 changes the selected resource to the resource in the past deployment history of the requesting user and returns the system administrator that the change has been made. Furthermore, in a case where the remaining resources do not satisfy the current machine deployment request and the shortage is solved by changing the resource to the resource in the past deployment history of the requesting user, the machine deployment determination unit 123 changes the selected resource to the resource in the past deployment history of the requesting user and returns the system administrator that the change has been made.

In other words, the machine deployment determination unit 123 is an example of a determination unit and allocates each resource to the user 2 in ascending order of the total value of the first score and the second score.

The machine deployment execution unit 125 receives deployment request information determined by the machine deployment determination unit 123 and actually deploys a machine.

Figure 4:
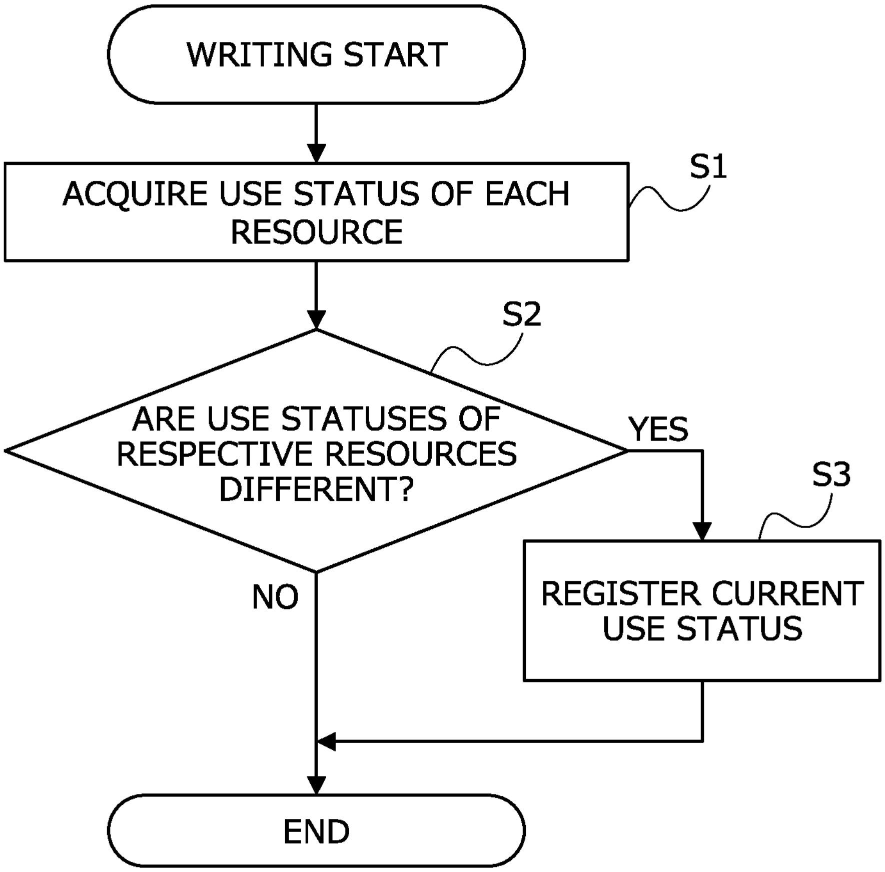
FIG. 4 is a flowchart for explaining processing for performing writing into a resource pool registration and deployment status database (DB) according to the embodiment.

Processing for performing writing into the resource pool registration and deployment status DB 143 according to the embodiment will be described with reference to the flowchart (operations S1 to S3) illustrated in FIG. 4.

The resource pool usage status acquisition unit 111 periodically acquires the resource use status of each resource (operation S1).

The resource pool usage status acquisition unit 111 determines whether or not the resource use statuses of the respective resources are different (in other words, updated) (operation S2).

In a case where there is no difference (in other words, update) between the resource use statuses of the respective resources (refer to No route in operation S2), the processing for writing into the resource pool registration and deployment status DB 143 ends, and the processing is periodically restarted.

In a case where there is a difference (in other words, update) between the resource use statuses of the respective resources (refer to YES route in operation S2), the resource pool usage status acquisition unit 111 registers a current use status into the resource pool registration and deployment status DB 143 (operation S3). Then, the processing for writing into the resource pool registration and deployment status DB 143 ends, and the processing is periodically restarted.

Figure 5:
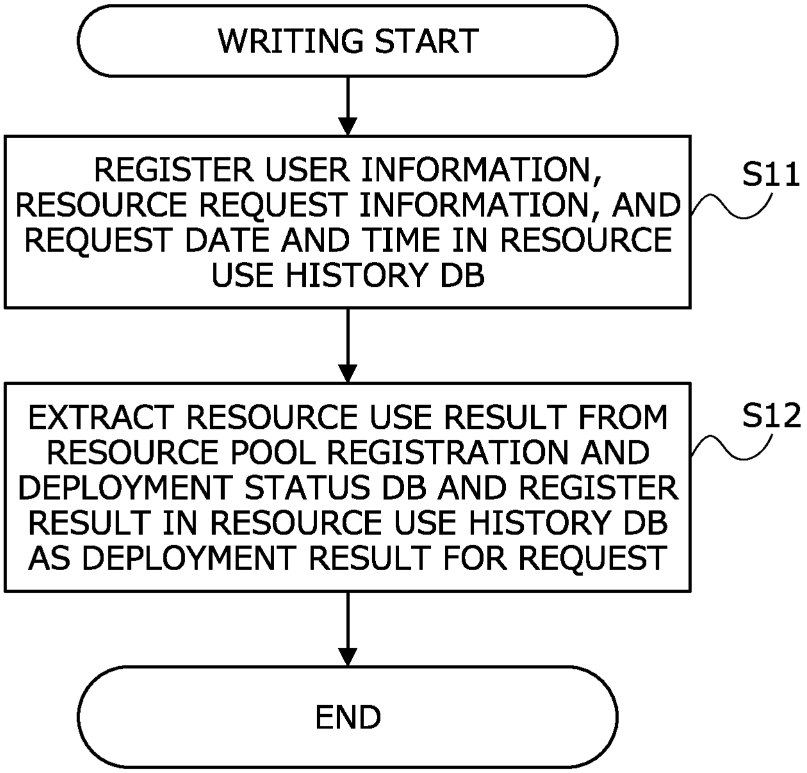
FIG. 5 is a flowchart for explaining processing for updating a resource use history DB according to the embodiment.

Next, processing for updating the resource use history DB 141 according to the embodiment will be described with reference to the flowchart (operations S11 and S12) illustrated in FIG. 5.

When a resource use request is issued from the user, the resource use history acquisition unit 112 registers user information, resource request information, and a request date and time in the resource use history DB 141 (operation S11).

The resource deployment status acquisition unit 113 extracts a resource use result from the resource pool registration and deployment status DB 143 and registers the result, as a deployment result for the request, in the resource use history DB 141 (operation S12). Then, the processing for updating the resource use history DB 141 ends, and the processing is restarted each time when the resource use request is issued.

Figure 6:
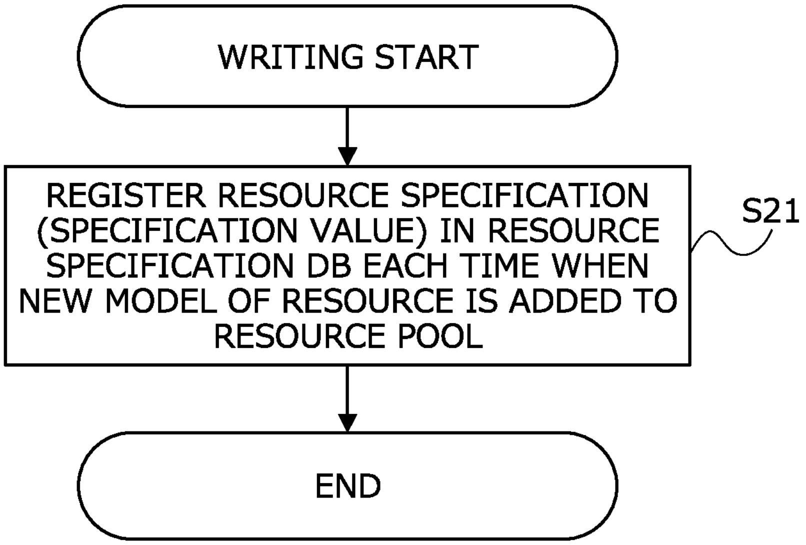
FIG. 6 is a flowchart for explaining processing for updating a resource specification DB according to the embodiment.

Next, processing for updating the resource specification DB 142 according to the embodiment will be described with reference to the flowchart (operation S21) illustrated in FIG. 6.

Each time when a new model of a resource is added to the resource pool 102, a system administrator (not illustrated) registers a resource specification (in other words, specification value) of the resource in the resource specification DB 142 by the resource specification input unit 114 (operation S21). Then, the processing for updating the resource specification DB 142 ends, and the processing is restarted each time when a new model of a resource is added.

Figure 7:
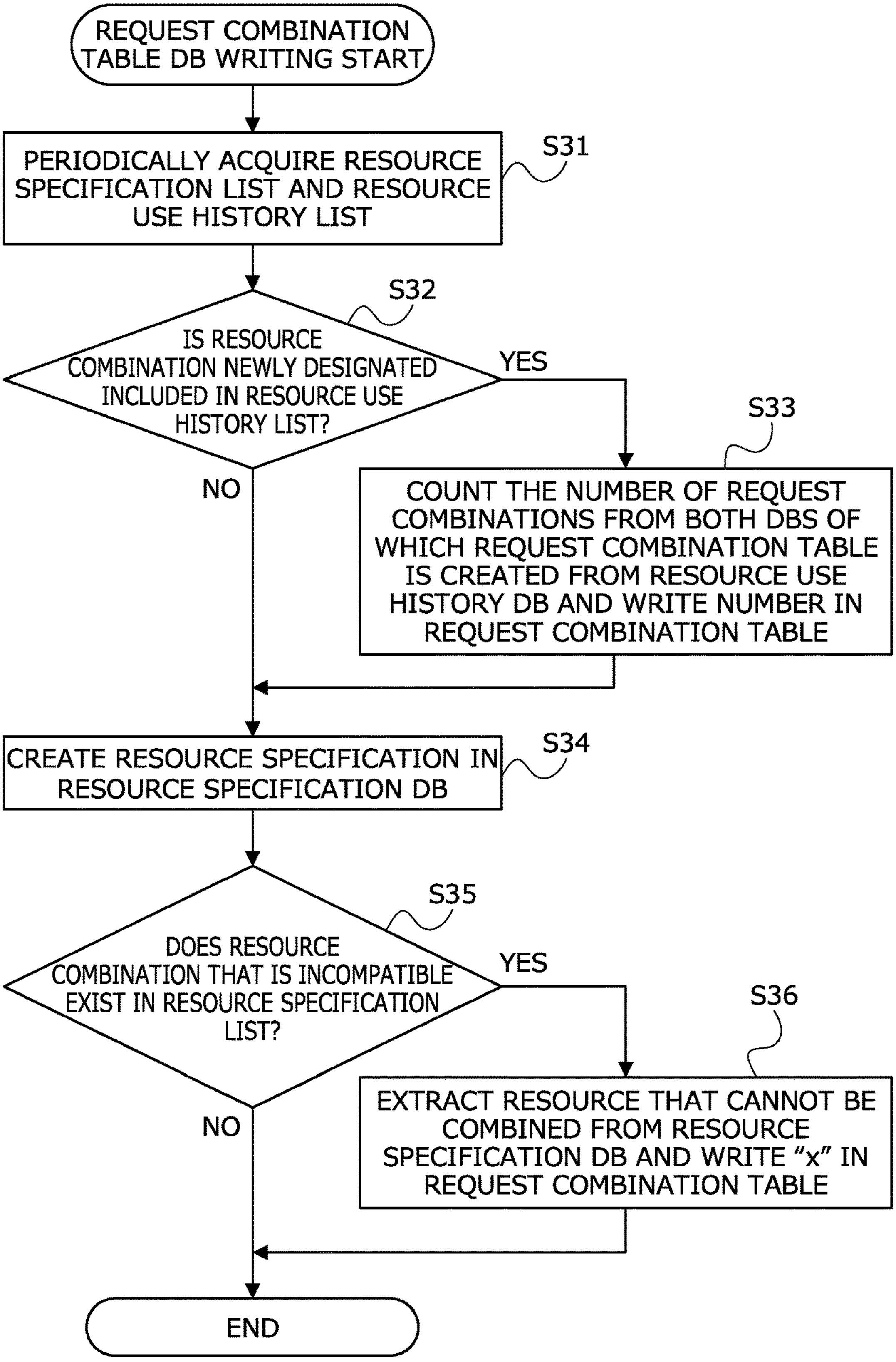
FIG. 7 is a flowchart for explaining processing for updating a request combination table DB according to the embodiment.

Next, processing for updating the request combination table DB 144 according to the embodiment will be described with reference to the flowchart (operations S31 to S36) illustrated in FIG. 7.

The request combination table creation update unit 115 periodically acquires the resource specification DB 142 and the resource use history DB 141 (operation S31).

The request combination table creation update unit 115 determines whether or not a resource combination newly designated by the user is included in the resource use history DB 141.

In a case where the resource combination newly designated by the user is not included in the resource use history DB 141 (refer to No route in operation S32), the processing proceeds to operation S34.

On the other hand, in a case where the resource combination newly designated by the user is included in the resource use history DB 141 (refer to YES route in operation S32), the request combination table creation update unit 115 creates the request combination table DB 144 from the resource use history DB 141. Then, the request combination table creation update unit 115 counts the number of request combinations from the resource specification DB 142 and the resource use history DB 141 and writes the number into the table of the request combination table DB 144 (operation S33).

The resource specification input unit 114 creates a resource specification in the resource specification DB 142 (operation S34).

The request combination table creation update unit 115 determines whether or not there is a resource combination that is incompatible with the resource specification DB 142 (operation S35).

In a case where there is no resource combination that is incompatible with the resource specification DB 142 (refer to No route in operation S35), the processing for updating the request combination table DB 144 ends, and the processing is periodically restarted.

On the other hand, in a case where there is a resource combination that is incompatible with the resource specification DB 142 (refer to YES route in operation S35), the request combination table creation update unit 115 extracts a resource that cannot be combined from the resource specification DB 142 and writes "x" in the table of the request combination table DB 144 (operation S36). Then, the processing for updating the request combination table DB 144 ends, and the processing is periodically restarted.

Figure 8:
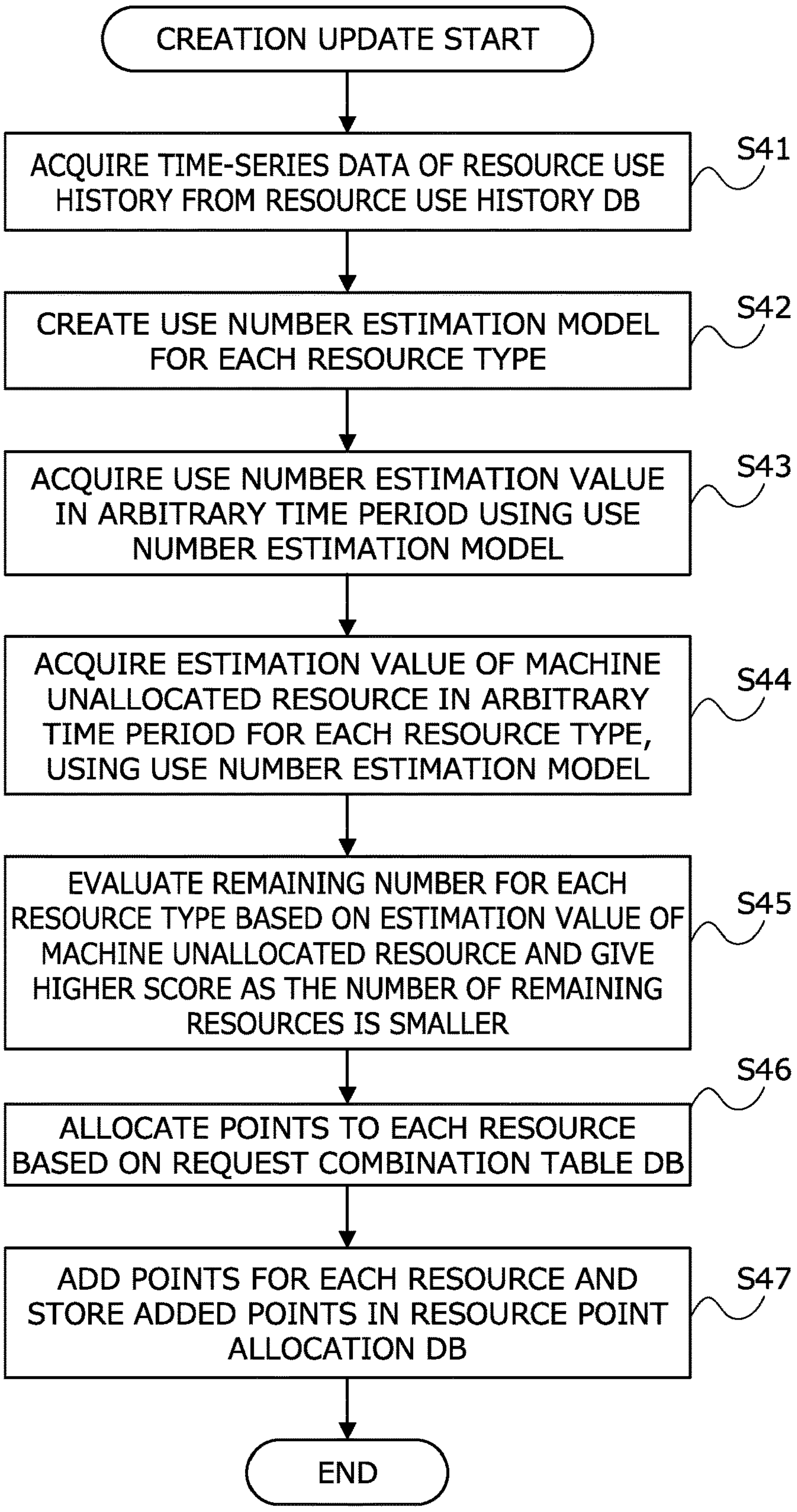
FIG. 8 is a flowchart for explaining processing for updating resource point allocation according to the embodiment.

Next, processing for updating the resource point allocation according to the embodiment will be described with reference to the flowchart (operations S41 to S47) illustrated in FIG. 8.

The use number estimation model creation unit 116 acquires time-series data of a resource use history from the resource use history DB 141 (operation S41).

The use number estimation model creation unit 116 creates a use number estimation model for each resource type (operation S42).

The resource demand estimation unit 117 acquires a use number estimation value in an arbitrary time period, using the use number estimation model (operation S43).

The machine unallocated resource estimation unit 118 acquires an estimation value of a machine unallocated resource (in other words, remaining number) in an arbitrary time period for each resource type, using the use number estimation model (operation S44).

The remaining resource number point allocation unit 119 evaluates the remaining number for each resource type based on the estimation value of the machine unallocated resource and gives a higher score as the number of remaining resources is smaller (operation S45).

The resource combination point allocation unit 120 allocates points to each resource, based on the request combination table DB 144 (operation S46). For example, "1"=2 points, "x"=−1 point, or the like in the table in the request combination table DB 144 are allocated.

The point allocation calculation unit for each resource 121 adds the points to the respective resources obtained by the resource combination point allocation unit 120 and the remaining resource number point allocation unit 119 and stores the added points in the resource point allocation DB 145 (operation S47). Then, the processing for updating the resource point allocation ends.

Figure 9:
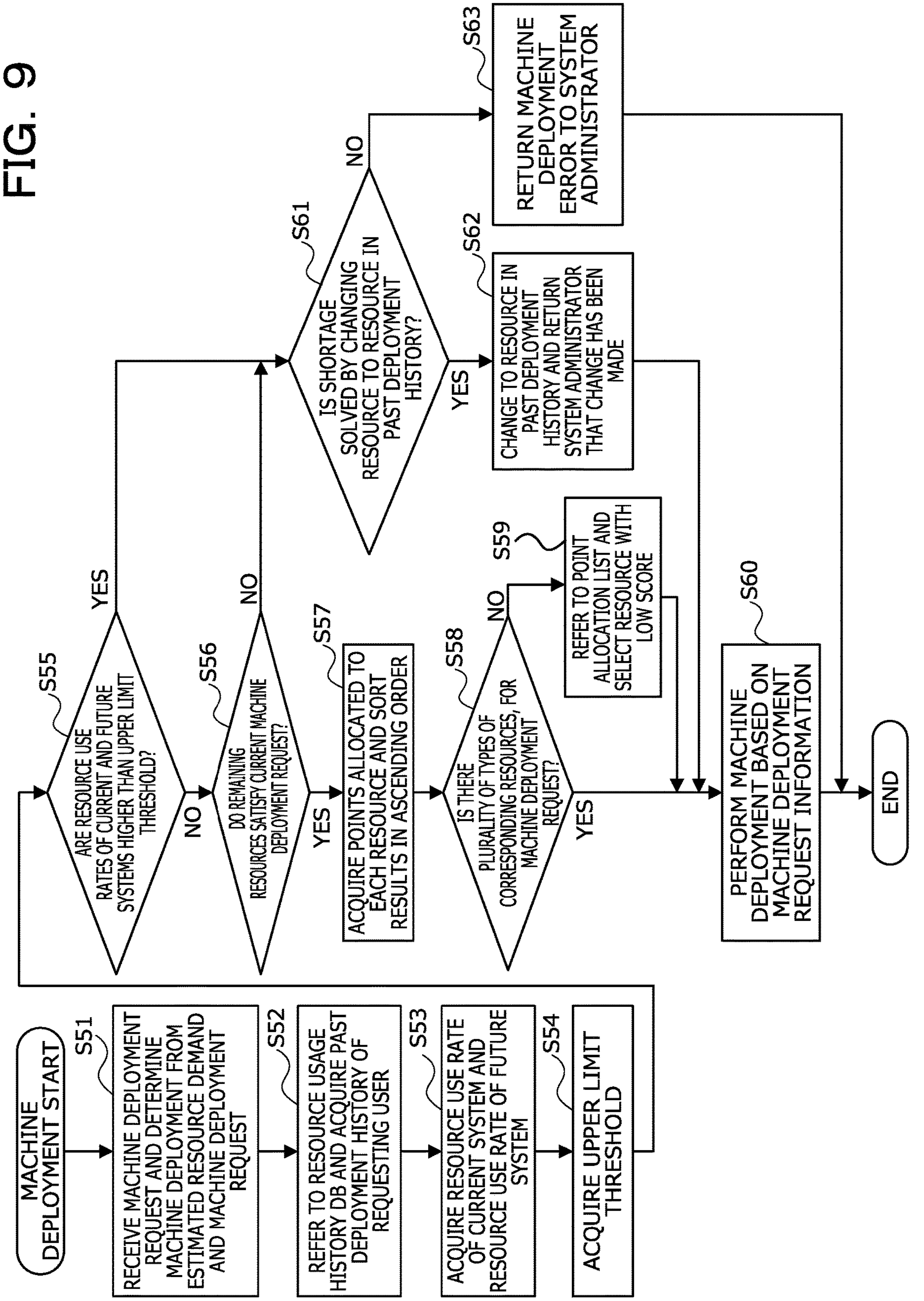
FIG. 9 is a flowchart for explaining machine deployment processing according to the embodiment.

Next, machine deployment processing according to the embodiment will be described with reference to the flowchart (operations S51 to S63) illustrated in FIG. 9.

The machine deployment request reception unit 122 receives a machine deployment request from the user 2. Moreover, the machine deployment determination unit 123 determines machine deployment from an estimated resource demand and the machine deployment request (operation S51).

The machine deployment determination unit 123 refers to the resource use history DB 141 and acquires a past deployment history of the requesting user (operation S52).

The machine deployment determination unit 123 acquires a resource use rate of a current system from the resource pool registration and deployment status DB 143 and acquires a resource use rate of a future system from the resource demand estimation unit 117 (operation S53).

The machine deployment determination unit 123 acquires an upper limit threshold from the use rate threshold acquisition unit 124 (operation S54).

The machine deployment determination unit 123 determines whether or not the resource use rates of the current and the future systems are higher than the upper limit threshold (operation S55).

In a case where the resource use rates of the current and the future systems are not higher than the upper limit threshold (refer to No route in operation S55), the machine deployment determination unit 123 determines whether or not remaining resources satisfy the current machine deployment request (operation S56).

In a case where the remaining resources satisfy the current machine deployment request (refer to YES route in operation S56), the machine deployment determination unit 123 acquires points allocated to each resource obtained based on the resource point allocation DB 145 and sorts the results in ascending order (operation S57).

The machine deployment determination unit 123 determines whether or not there is a plurality of types of corresponding resources, for the machine deployment request (operation S58).

In a case where there is the plurality of types of corresponding resources for the machine deployment request (refer to YES route in operation S58), the processing proceeds to operation S60.

On the other hand, in a case where the plurality of types of corresponding resources does not exist for the machine deployment request (refer to No route in operation S58), the machine deployment determination unit 123 refers to a point allocation list and selects a resource with a lower score (operation S59).

Machine deployment request information determined by the machine deployment determination unit 123 is transferred to the machine deployment execution unit 125, and the machine is actually deployed (operation S60). Then, the machine deployment processing according to the embodiment ends.

In a case where the resource use rates of the current and the future systems are higher than the upper limit threshold in operation S55 (refer to YES route in operation S55) or in a case where the remaining resources do not satisfy the current machine deployment request in operation S56 (refer to No route in operation S56), the processing proceeds to operation S61. The machine deployment determination unit 123 determines whether or not shortage is solved by changing the resource to the resource in the past deployment history of the requesting user (operation S61).

In a case where the shortage is solved by changing the resource to the resource in the past deployment history of the requesting user (refer to YES route in operation S61), the machine deployment determination unit 123 changes the selected resource to the resource in the past deployment history of the requesting user and returns the system administrator that the change has been made (operation S62). Then, the processing proceeds to operation S60.

In a case where the shortage is not solved by changing the resource to the resource in the past deployment history of the requesting user (refer to No route in operation S61), since the remaining resources cannot satisfy the machine deployment request, the machine deployment determination unit 123 returns a machine deployment error to the system administrator (operation S63). Then, the machine deployment processing according to the embodiment ends.

FIG. 10 is a table illustrating the resource pool registration and deployment status DB 143 according to the embodiment.

In the resource pool registration and deployment status DB 143, a resource ID, a resource name, a resource type, a resource model, a machine deployment state may be registered in association.

In the resource pool registration and deployment status DB 143, a name, a type, a specification, or the like of the resource are described in individual units of resources. In a case where the resources with the same type and the same model exist (resource IDs=1, 4, and 5 in example illustrated in FIG. 10), resources as many as the existing resources are described. In a case where a resource is newly coupled, the number of records increases.

FIG. 11 is a table illustrating the resource use history DB 141 according to the embodiment.

In the resource use history DB 141, a use history ID, a machine name, a deployment date and time, a disassembly date and time, a used resource, a used Image, a version of a used driver, and information regarding a request from a user may be registered in association.

In the resource use history DB 141, a list of resources designated by the user, among the resources used at the time of machine deployment, is described.

In a case where "equal to or more than a certain performance" is designated from the user 2, a mark is given to the used resource (* in example illustrated in FIG. 11), and this is described in the information regarding the request from the user 2.

In a case where the resources with the same type and the same model are used, the marks as many as the existing resources are described in the field of the used resource.

FIG. 12 is a table illustrating the resource specification DB 142 according to the embodiment.

In the resource specification DB 142, a resource ID, a resource name, a resource type, a resource model, and a resource specification are registered in association.

In the resource specification DB 142, a name, a type, a specification, or the like of the resource are described in resource model units. This specification information is acquired using the resource model in the resource pool registration and deployment status DB 143 and is associated with the resource specification DB 142. In a case where a new resource is installed, the number of records in the resource specification DB 142 is increased.

Figure 13:
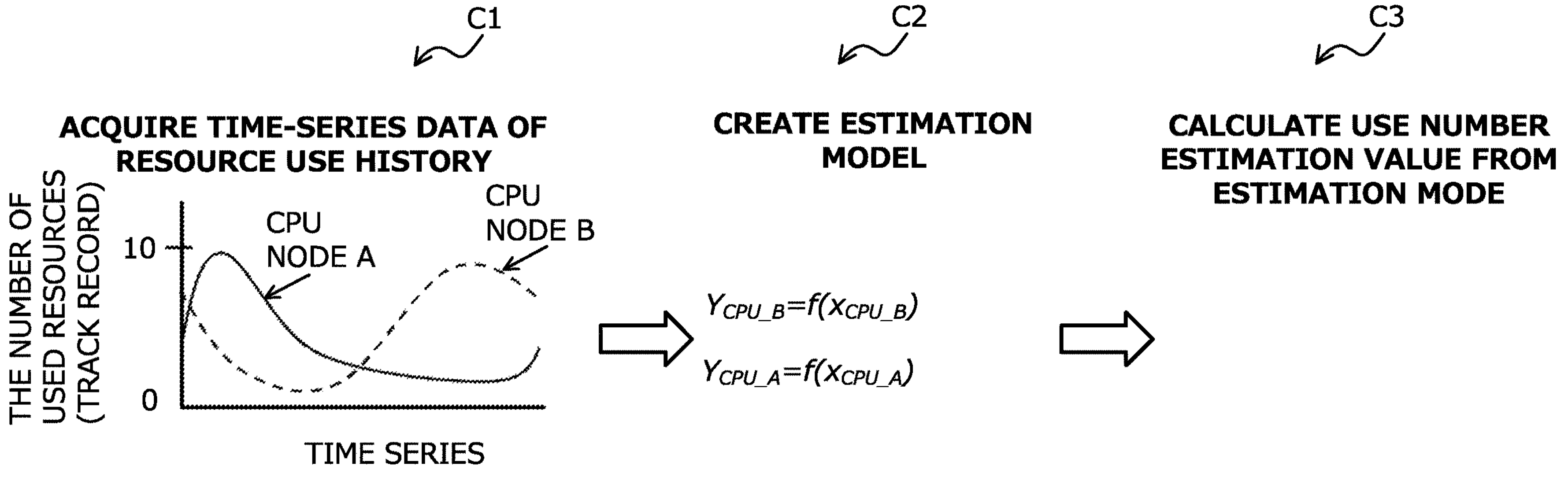
FIG. 13 is a diagram for explaining resource cycle use estimation processing according to the embodiment.

FIG. 13 is a diagram for explaining resource cycle use estimation processing according to the embodiment.

As indicated by a reference C1, time-series data of the number of used resources (actual values) for each resource is acquired from the resource use history DB 141.

As indicated by a reference C2, estimation models $Y_{CPU\_B}=f(X_{CPU\_B})$ and $Y_{CPU\_A}=f(X_{CPU\_A})$ are created.

As indicated by a reference C3, the use number estimation value is calculated based on the estimation model.

Figure 14:
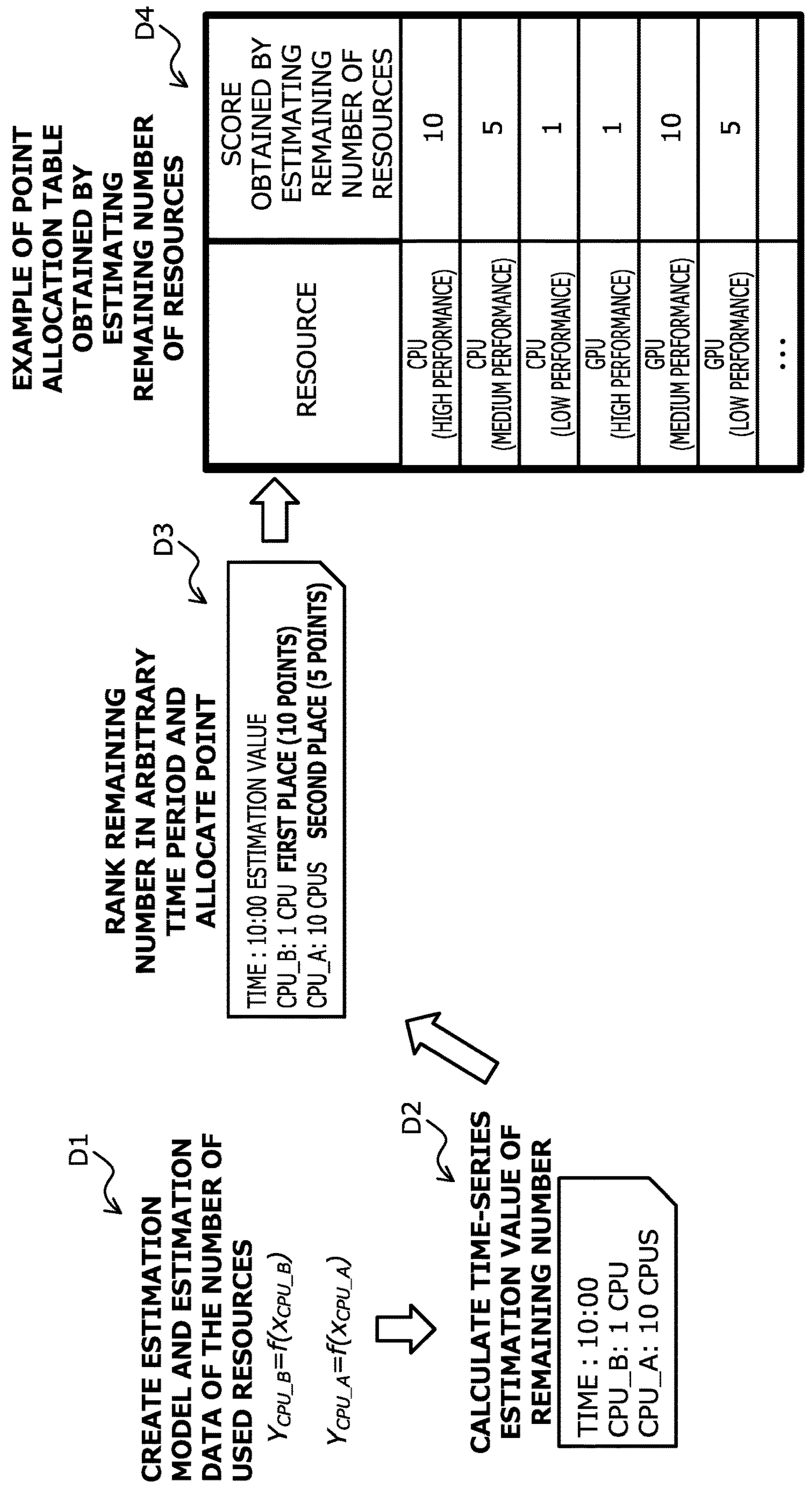
FIG. 14 is a diagram for explaining processing for estimating the number of remaining resources according to the embodiment.

FIG. 14 is a diagram for explaining processing for estimating the number of remaining resources according to the embodiment.

As indicated by a reference D1, the use number estimation models $Y_{CPU\_B}=f(X_{CPU\_B})$ and $Y_{CPU\_A}=f(X_{CPU\_A})$ of the resource illustrated in FIG. 13 are created.

As indicated by a reference D2, a time-series estimation value of the machine unallocated resource (in other words, remaining number) is calculated for each resource type, using the use number estimation model. In the example in FIG. 14, it is estimated that, at 10:00, the remaining number of the CPU_B is one and the remaining number of CPU_A is 10.

As indicated by a reference D3, the remaining number is evaluated for each resource type, and a higher score and a higher rank are given as the number of remaining resources is smaller. In the example illustrated in FIG. 14, at 10:00, the first place (10 points) is given to the CPU_B of which the remaining number is one, and the second place (five points) is given to the CPU_A of which the remaining number is 10. As a method of scoring, for example, a ranking may be determined based on a remaining number ratio with respect to a total amount, in addition to the ranking based on the remaining number.

Then, as indicated by a reference D4, a score table is obtained by estimating the number of remaining resources. In the table illustrated in FIG. 14, a score of the high-performance CPU (CPU_B) is 10, and a score of a medium-performance CPU is five.

Figure 15:
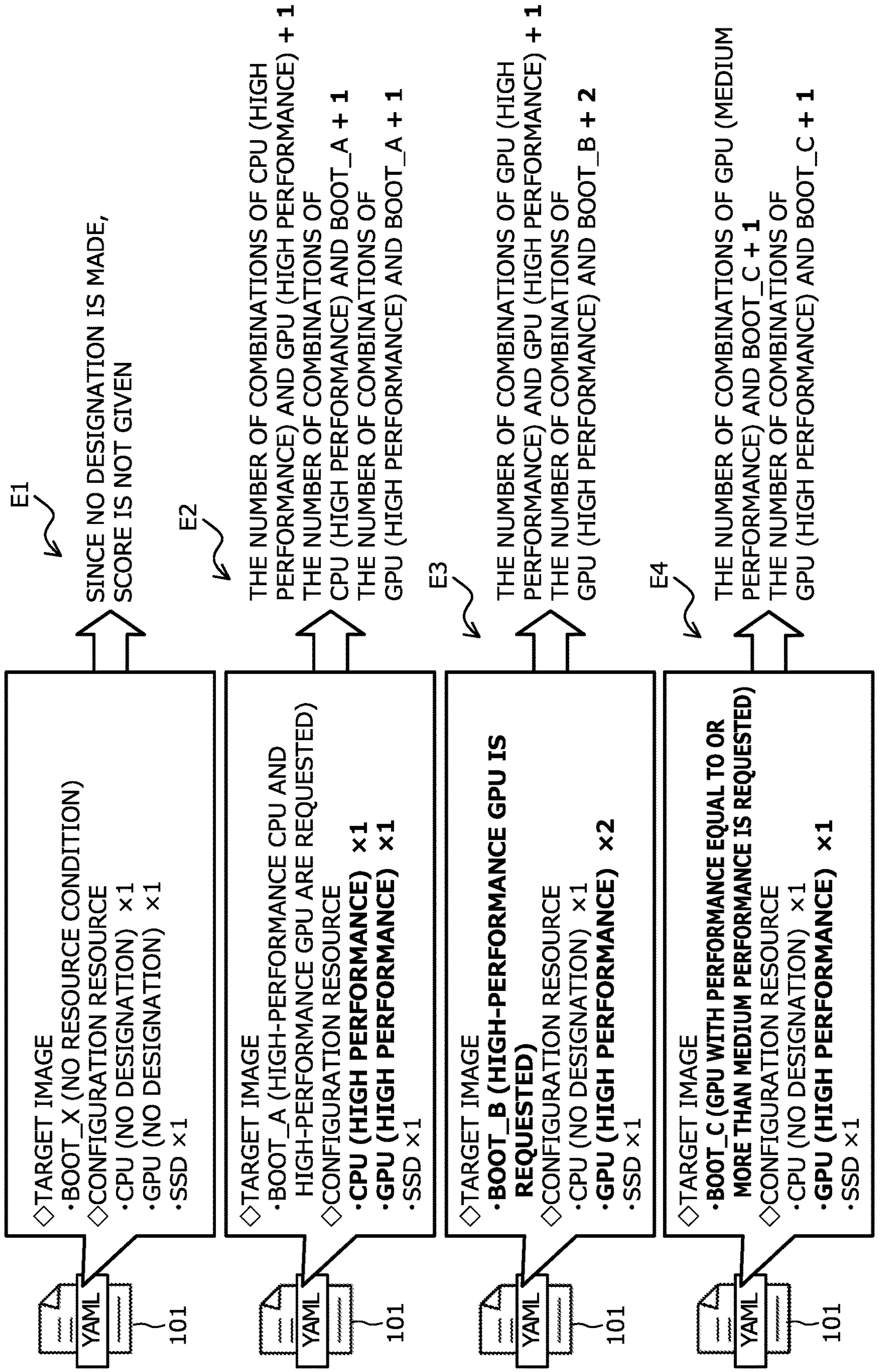
FIG. 15 is a diagram for explaining processing for confirming a BOOT image and the number of times of combinations between the resources according to the embodiment.

FIG. 15 is a diagram for explaining processing for confirming a BOOT image and the number of times of combinations between the resources according to the embodiment.

From a request history of the YAML 101 so far from the user, the number of requested resource combinations is confirmed.

In a request history of the YAML 101 indicated by a reference E1, "BOOT_X (no resource condition)" is designated as the target image, and "CPU (no designation)*1", "GPU (no designation)*1", and "SSD*1" are designated as the configuration resources. In the example indicated by the reference E1, since the performance is not designated, no score is given.

In a request history of the YAML 101 indicated by a reference E2, "BOOT_X (high-performance CPU and high-performance GPU are requested) is designated as the target image, and "CPU (high performance)*1", "GPU (high performance)*1", and "SSD*1" are designated as the configuration resources. In the example indicated by the reference E2, the number of "combinations of CPU (high performance) and GPU (high performance)" is +1, the number of "combinations of CPU (high performance) and BOOT_A" is +1, and the number of "combinations of GPU (high performance) and BOOT_A" is +1.

In a request history of the YAML 101 indicated by a reference E3, "BOOT_X (high-performance GPU is requested) is designated as the target image, and "CPU (no designation)*1", "GPU (high performance)*2", and "SSD*1" are designated as the configuration resources. In the example indicated by the reference E3, the number of "combinations of GPU (high performance) and GPU (high performance)" is +1, and the number of "combinations of "GPU (high performance) and BOOT_B" is +2. If there is the plurality of resources, the duplicated resources are counted. In a case indicated by the reference E3, since there are two GPUs (high performance), the number of combinations with BOOT_B is two.

In a request history of the YAML 101 indicated by a reference E4, "BOOT_X (GPU with equal to or higher than medium performance is requested) is designated as the target image, and "CPU (no designation)*1", "GPU (high performance)*1", and "SSD*1" are designated as the configuration resources. In the example indicated by the reference E4, the number of "combinations of GPU (medium performance) and BOOT_C" is +1, and the number of "combinations of GPU (high performance) and BOOT_C" is +1. In a case where the requested performance is "equal to or more than certain performance", points are added to a combination with that performance or more. In a case indicated by the reference E4, points are added to the GPU (medium performance) and the GPU (high performance).

FIG. 16 is a table illustrating a first example of the request combination table DB 144 according to the embodiment.

In the list of the request combinations illustrated in FIG. 16, the number of times of combinations (number) counted in FIG. 15 is added and registered.

For example, "1" is registered for the combination of the CPU (high performance) and the GPU (high performance), and "2" is registered for the combination of the GPU "high performance" and BOOT_B.

FIG. 17 is a table illustrating a second example of the request combination table DB 144 according to the embodiment.

In a list of request combinations illustrated in FIG. 17, in addition to the number of times of combinations registered in FIG. 16, an "x" mark is registered for a request combination that is not possible. The request combination that is not possible may be a combination with no compatibility, specified by acquiring resource specifications from manufacturer's web sites, catalogs, or the like.

In the example illustrated in FIG. 17, a combination of the CPU (high performance) and the GPU (medium performance) is registered as unavailable. Furthermore, since only one img (Image) file is used, all combinations of the img files are registered as unavailable.

FIG. 18 is a table illustrating a holding point of each resource according to the embodiment.

Regarding the holding point of each resource illustrated in FIG. 18, a value of the number of cases may be added, and an "x" mark may be subtracted, in the list of the request combinations illustrated in FIG. 17.

In the example illustrated in FIG. 18, a score in a case where it is assumed that "1"=+2 points and "x"=−1 point is registered. For example, for the CPU (high performance), since two "1" and one "x" exist in the list illustrated in FIG. 17, $(+2)*2+(-1)\times1=3$ is registered as a score.

FIG. 19 is a diagram for explaining processing for generating the resource point allocation DB 145 according to the embodiment.

The resource point allocation DB 145 indicated by a reference F3 in FIG. 19 is generated by adding scores in the score table obtained by estimating the remaining number of resources illustrated in FIG. 14 (refer to reference F1) and the score table obtained based on the BOOT image and the number of times of combinations between the resources illustrated in FIG. 18 (refer to reference F2) and finally determining a score of each resource.

For example, in the CPU (high performance) in the resource point allocation DB 145 indicated by the reference F3, 13 that is a sum of 10 that is a value of the CPU (high performance) in the score table indicated by the reference F1 and 3 that is a value of the CPU (high performance) in the score table indicated by the reference F2.

Figure 20:
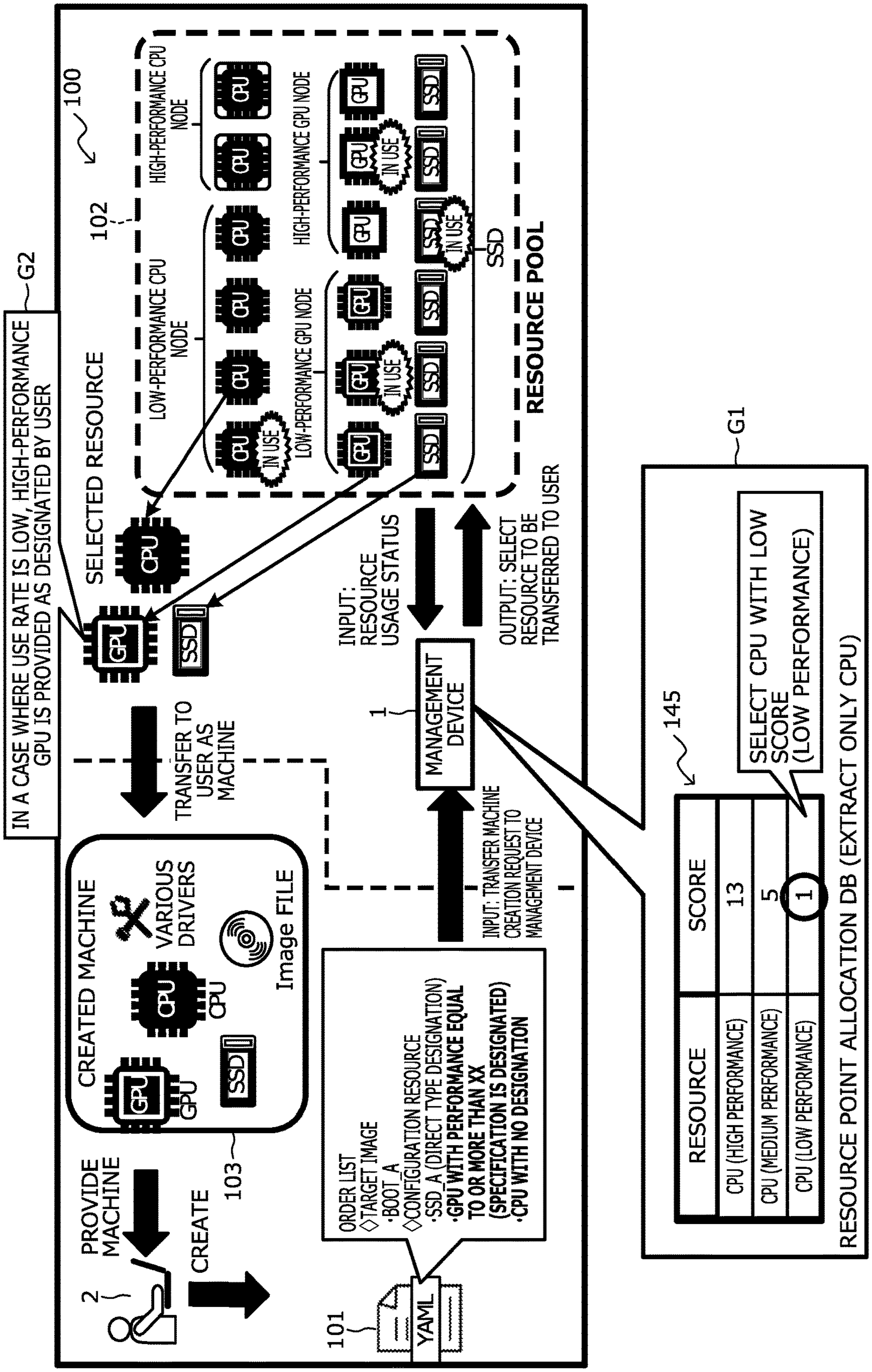
FIG. 20 is a block diagram illustrating resource extraction processing in a case where resource use rates of a current and future systems of the composable infrastructure system as the embodiment are lower than an upper limit threshold.

FIG. 20 is a block diagram illustrating resource extraction processing in a case where resource use rates of a current and future systems of the composable infrastructure system 100 as the embodiment are lower than an upper limit threshold.

In a case where the resource use rates of the current and the future systems are lower than the set upper limit threshold, the management device 1 selects from a resource with a lower score (in other words, resource with lower use frequency) at the time of creating a machine, in a range of resource designation and specification limitation designation from the user 2.

In the example illustrated in FIG. 20, as indicated by a reference G1, at the time of creating the machine, a CPU (low performance) with the lowest score "1" in the resource point allocation DB 145 is selected.

However, as indicated by a reference G2, in a case where a state where a use rate is low continues, the GPU (high performance) is provided as specified by the user 2.

Figure 21:
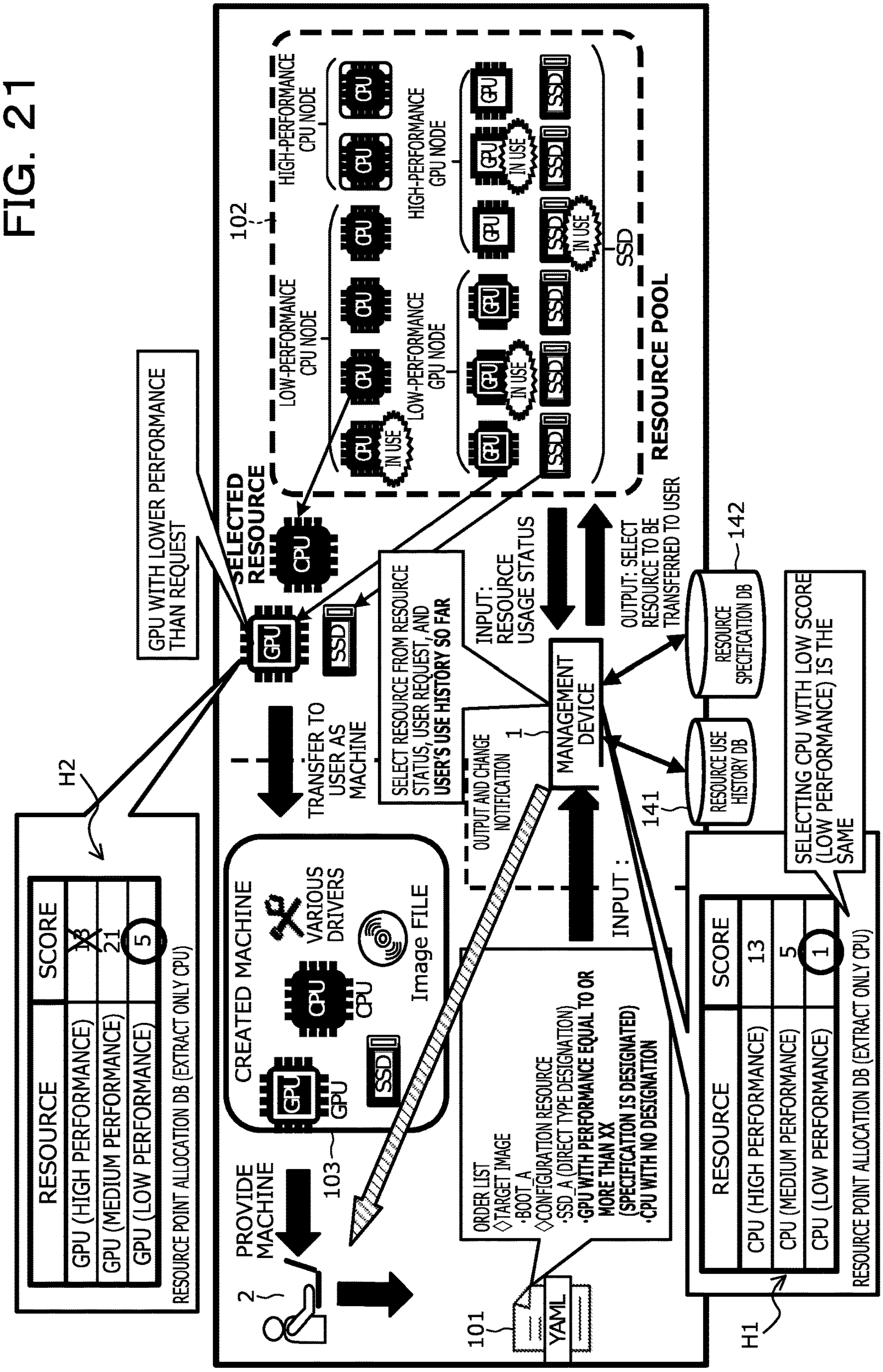
FIG. 21 is a block diagram illustrating resource extraction processing in a case where the resource use rates of the current and future systems of the composable infrastructure system as the embodiment are higher than the upper limit threshold.

FIG. 21 is a block diagram illustrating resource extraction processing in a case where the resource use rates of the current and future systems of the composable infrastructure system 100 as the embodiment are higher than the upper limit threshold.

In a case where the resource use rates of the current and the future systems are higher than the set upper limit threshold (in other words, a case of busy period when usage rate is high), the management device 1 intentionally extracts a hardware resource different from the request, so as to accept more jobs.

In the example illustrated in FIG. 21, as in the example illustrated in FIG. 20, as indicated by a reference H1, the CPU (low performance) with the lowest score "1" in the resource point allocation DB 145 is selected at the time of creating the machine.

As indicated by a reference H2, in a case where the use rate is lowered, a GPU different from a GPU designated by the user is provided. In a case of the example illustrated in FIG. 21, a GPU (GPU (low performance) in a case of FIG. 21) that has been used by the user 2 in the past and has a low score is provided.

The machine deployment determination unit 123 acquires a past request history of the requesting user from the resource use history DB 141 illustrated in FIG. 11, confirms and changes a resource in the past deployment history of the requesting user, and returns to the system administrator that the change has been made.

For example, a user name "A" is picked up from the resource use history DB 141 illustrated in FIG. 11, and a resource having many requests is selected from among the used resources. Then, if the resource is changed in a case where the usage rate is high, the resource is replaced with a resource with a low score that has been used in the past.

Figure 22:
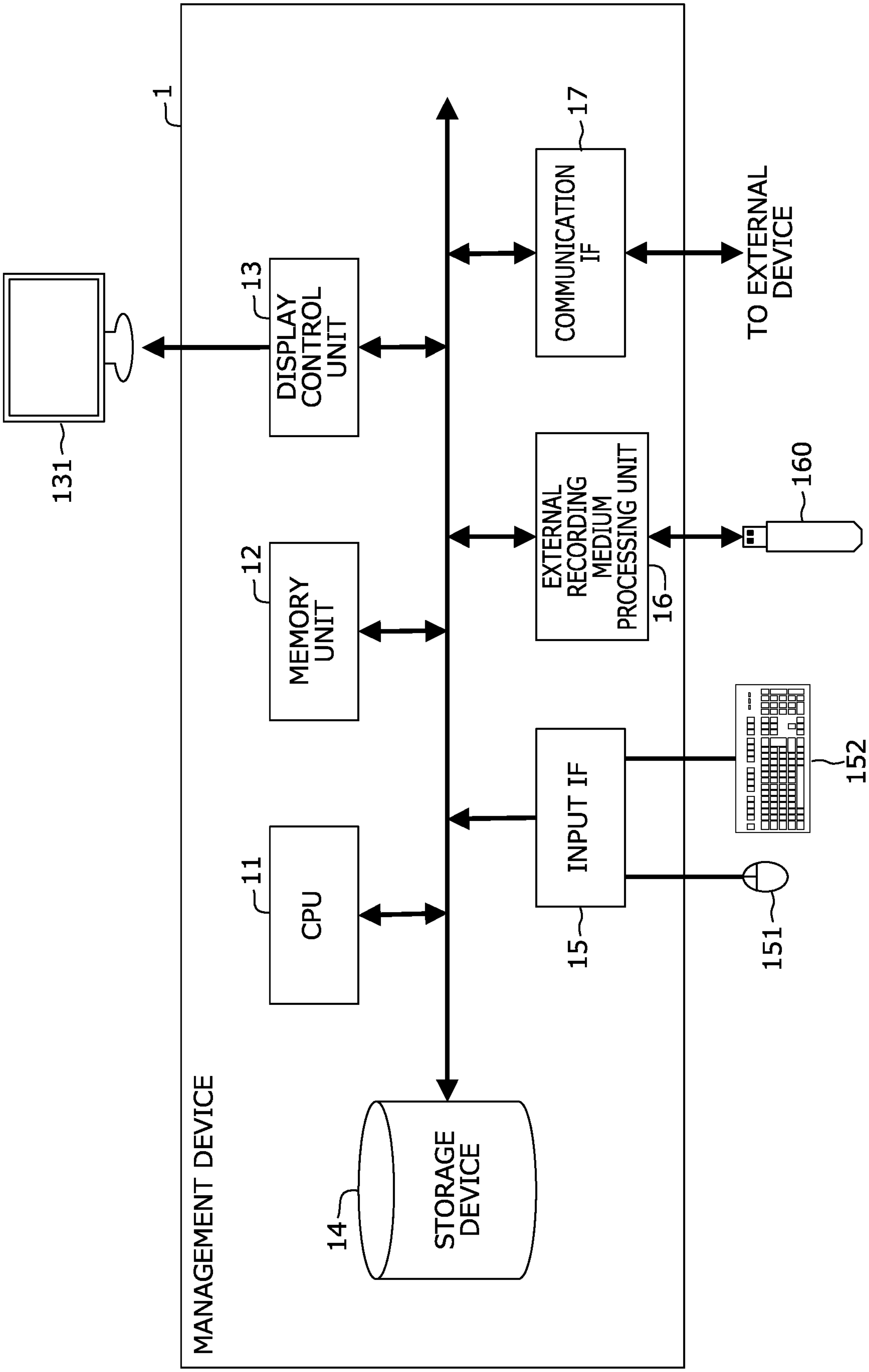
FIG. 22 is a block diagram schematically illustrating a hardware configuration example of a management device according to the embodiment.

FIG. 22 is a block diagram schematically illustrating a hardware configuration example of the management device 1 according to the embodiment.

As illustrated in FIG. 22, the management device 1 includes a central processing unit (CPU) 11, a memory unit 12, a display control unit 13, a storage device 14, an input interface (IF) 15, an external recording medium processing unit 16, and a communication IF 17.

The memory unit 12 is an example of a storage unit, and illustratively is a read only memory (ROM), a random access memory (RAM), or the like. Programs of a basic input/output system (BIOS) and the like may be written in the ROM of the memory unit 12. A software program of the memory unit 12 may be appropriately read and executed by the CPU 11. Furthermore, the RAM of the memory unit 12 may be used as a temporary recording memory or a working memory.

The display control unit 13 is coupled to a display device 131, and controls the display device 131. The display device 131 is a liquid crystal display, an organic light-emitting diode (OLED) display, a cathode ray tube (CRT), an electronic paper display, or the like, and displays various types of information for an operator or the like. The display device 131 may be combined with an input device, and may be, for example, a touch panel. The display device 131 displays various types of information for a user of the management device 1.

The storage device 14 is a storage device having high input/output (IO) performance, and for example, a dynamic random access memory (DRAM), a solid state drive (SSD), a storage class memory (SCM), and a hard disk drive (HDD) may be used.

The input IF 15 may be coupled to an input device such as a mouse 151 or a keyboard 152, and may control the input device such as the mouse 151 or the keyboard 152. The mouse 151 and the keyboard 152 are examples of the input devices, and an operator performs various types of input operations through these input devices.

The external recording medium processing unit 16 is configured in such a manner that a recording medium 160 may be attached thereto. The external recording medium processing unit 16 is configured in such a manner that information recorded in the recording medium 160 may be read in a state where the recording medium 160 is attached thereto. In the present example, the recording medium 160 is portable. For example, the recording medium 160 is a flexible disk, an optical disc, a magnetic disk, a magneto-optical disk, a semiconductor memory, or the like.

The communication IF 17 is an interface that enables communication with an external device.

The CPU 11 is an example of a processor and is a processing device that performs various controls and calculations. The CPU 11 implements various functions by executing an operating system (OS) or a program loaded into the memory unit 12. Note that the CPU 11 may be a multi-processor including a plurality of CPUs, or a multi-core processor having a plurality of CPU cores, or may have a configuration having a plurality of multi-core processors.

A device for controlling an overall operation of the management device 1 is not limited to the CPU 11 and may be, for example, any one of an MPU, a DSP, an ASIC, a PLD, or an FPGA. Furthermore, the device for controlling the operation of the entire management device 1 may be a combination of two or more of the CPU, the MPU, the DSP, the ASIC, the PLD, or the FPGA. Note that the MPU is an abbreviation for a micro processing unit, the DSP is an abbreviation for a digital signal processor, and the ASIC is an abbreviation for an application specific integrated circuit. Furthermore, the PLD is an abbreviation for a programmable logic device, and the FPGA is an abbreviation for a field programmable gate array.

[B] Effects

According to the resource management program, the management device 1, and the resource management method according to the embodiment described above, for example, the following effects may be obtained.

Figure 23:
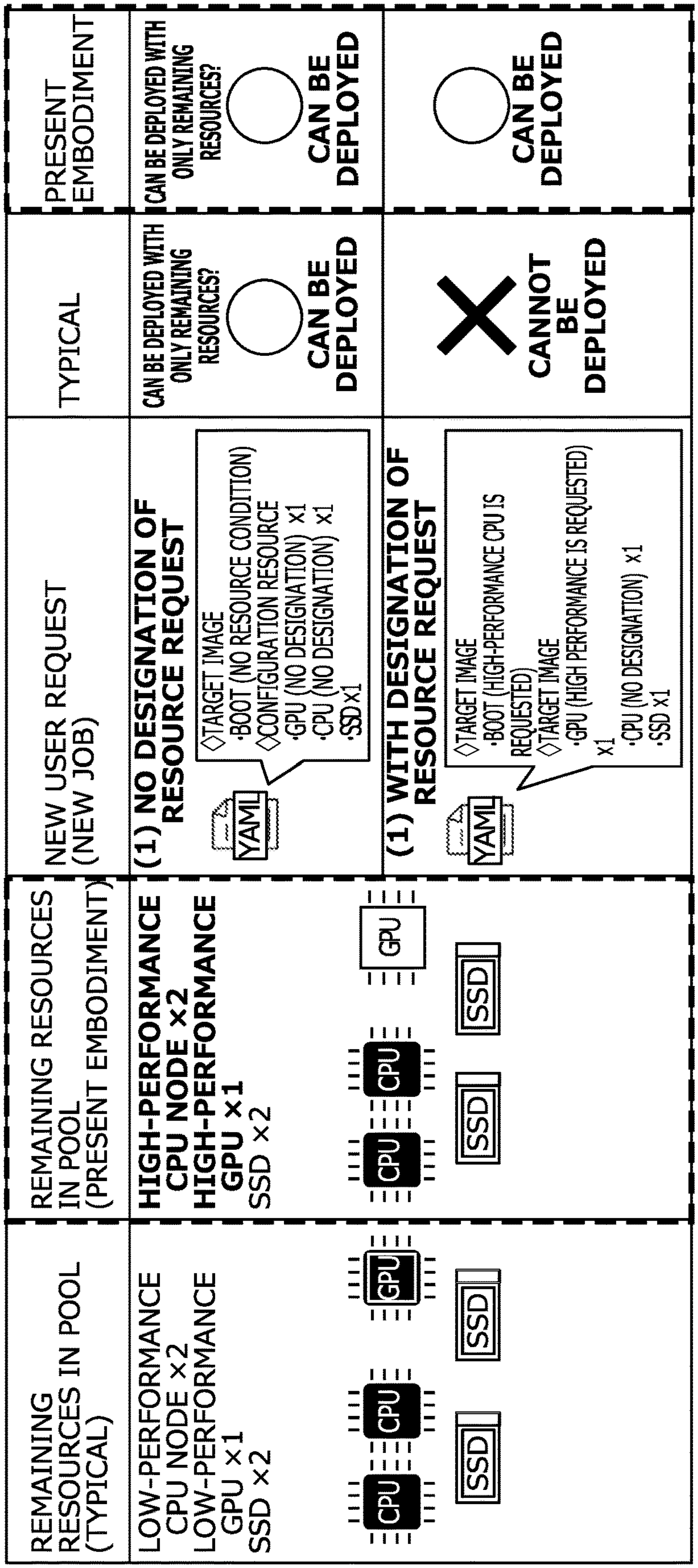
FIG. 23 is a diagram for explaining effects of the embodiment.

FIG. 23 is a diagram for explaining effects of the embodiment.

In the embodiment, it is possible to appropriately allocate a hardware resource to a job. Therefore, as illustrated in FIG. 23, even in a case where the remaining resources in the resource pool 602 include the low-performance CPU node*2, the low-performance GPU*1, and the SSD*2 in the typical example, the remaining resources in the resource pool can include the high-performance CPU node*2, the high-performance GPU*1, and the SSD*2 in the embodiment.

Here, in a case where "BOOT (no resource condition)" as a target image with no designation of a resource request and "GPU (no designation)*1", "CPU (no designation)*1", and "SSD*1" as configuration resources are issued as a new user request, the deployment can be performed using only the remaining resources in both of the typical example and the embodiment.

On the other hand, in a case where "BOOT (high performance CPU is requested)" as the target image with designation of the resource request and "GPU (high performance is requested)*1", "CPU (no designation)*1", and "SSD*1" as the configuration resources are issued as the new user request, it is not possible to perform the deployment using only the remaining resources in the typical example. However, the deployment can be performed using only remaining resources in the embodiment.

The remaining resource number point allocation unit 119 calculates the first score according to the number of unused resources in time series for each resource type of the virtualization system 100, from the resource use history DB 141 of the virtualization system 100 by the user 2. The resource combination point allocation unit 120 calculates the second score according to a use frequency and compatibility with another resource, for each resource. The machine deployment determination unit 123 allocates each resource to the user 2 in ascending order of the total value of the first score and the second score.

As a result, it is possible to improve a utilization efficiency of the virtualization system 100. For example, the hardware resource allocation to the job becomes appropriate, and a new job with resource designation may be performed without depletion of the hardware resource.

[C] Others

The disclosed technique is not limited to the embodiment described above, and various modifications may be made and carried out in a range without departing from the spirit of the present embodiment. Each configuration and each processing of the present embodiment may be selected or omitted as desired, or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a resource management program for causing a computer that manages a virtualization system to execute a process, the process comprising:

obtaining a first score according to a time-series number of unused resources for each resource type in the virtualization system, based on a use history of resources in the virtualization system by a user;

obtaining, for each resource, a second score according to a use frequency and compatibility with another resource; and allocating each resource to the user in ascending order of a total value of the first score and the second score, wherein the process allocates each resource to the user in a case where a resource use rate of the virtualization system is higher than a predetermined value, and when the resource use rate of a current and a future virtualization system is higher than a upper limit threshold and shortage is solved by changing the resource to a resource in a past deployment history of a requesting user, changes a selected resource to the resource in the past deployment history of the requesting user.

2. The non-transitory computer-readable recording medium according to claim 1, wherein the process adds the second score of a resource according to the use frequency, in the obtaining the second score.

3. The non-transitory computer-readable recording medium according to claim 1, wherein the process subtracts the second score of a resource with a low compatibility, in the obtaining the second score.

4. A resource management method for causing a computer that manages a virtualization system to execute a process, the process comprising:

obtaining a first score according to a time-series number of unused resources for each resource type in the virtualization system, based on a use history of resources in the virtualization system by a user;

obtaining, for each resource, a second score according to a use frequency and compatibility with another resource; and allocating each resource to the user in ascending order of a total value of the first score and the second score, wherein the process allocates each resource to the user in a case where a resource use rate of the virtualization system is higher than a predetermined value, and when the resource use rate of a current and a future virtualization system is higher than a upper limit threshold and shortage is solved by changing the resource to a resource in a past deployment history of a requesting user, changes a selected resource to the resource in the past deployment history of the requesting user.

5. The resource management method according to claim 4, wherein the process adds the second score of a resource according to the use frequency, in the obtaining the second score.

6. The resource management method according to claim 4, wherein the process subtracts the second score of a resource with a low compatibility, in the obtaining the second score.

7. A management device that manages a virtualization system, the management device comprising:

a memory; and a processor coupled to the memory and configured to:

obtain a first score according to a time-series number of unused resources for each resource type in the virtualization system, based on a use history of resources in the virtualization system by a user;

obtain, for each resource, a second score according to a use frequency and compatibility with another resource; and allocate each resource to the user in ascending order of a total value of the first score and the second score, wherein the processor allocates each resource to the user in a case where a resource use rate of the virtualization system is higher than a predetermined value, and when the resource use rate of a current and a future virtualization system is higher than a upper limit threshold and shortage is solved by changing the resource to a resource in a past deployment history of a requesting user, changes a selected resource to the resource in the past deployment history of the requesting user.

8. The management device according to claim 7, wherein the processor adds the second score of a resource according to the use frequency, in the obtaining the second score.

9. The management device according to claim 7, wherein the processor subtracts the second score of a resource with a low compatibility, in the obtaining the second score.

* * * * *